Nov. 27, 1934. L. R. HAND ET AL Re. 19,386

BOLT AND CLAMP

Original Filed April 6, 1931

Leon R. Hand,
Lewis A. Eyster,
INVENTOR

BY Victor J. Evans and Co.
ATTORNEYS

WITNESS:

Reissued Nov. 27, 1934

Re. 19,386

UNITED STATES PATENT OFFICE 19,386

BOLT AND CLAMP

Leon R. Hand, Hummels Wharf, and Lewis A. Eyster, Sunbury, Pa.

Original No. 1,870,112, dated August 2, 1932, Serial No. 528,170, April 6, 1931. Application for reissue July 12, 1934, Serial No. 734,858

3 Claims. (Cl. 24—243)

Our present invention has reference to a clamp, such as a pipe clamp, a clamp for battery terminals, a clamp for cables, hinge clamps and the like, and our object is the provision of means for expanding such clamps to permit of the same being positioned upon the article or object to be engaged thereby, removed therefrom or for compressing the same for tightly engaging such object.

To the attainment of the foregoing the invention consists in the improvement hereinafter described and definitely claimed.

Figure 1:
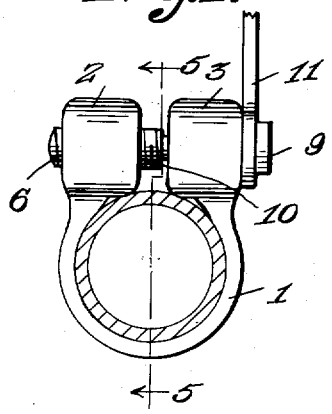
Figure 1 is a plan view of the improvement in applied position.
Figure 2:
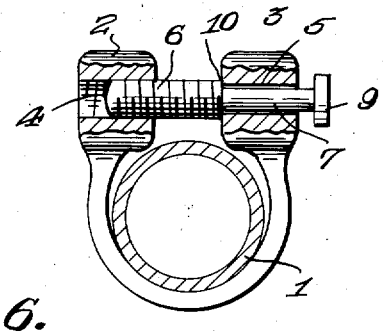
Figure 2 is a similar view with parts in section and showing the manner in which the bolt expands the clamp.
Figure 6:
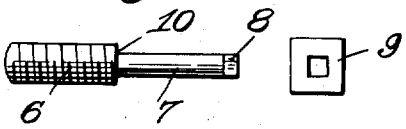
Figure 6 is a plan view of the bolt and the head therefor removed from the bolt.
Figure 3:
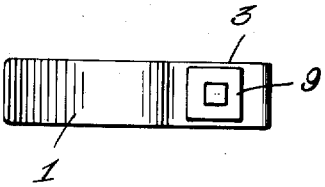
Figure 3 is a side elevation of the clamp.
Figure 4:
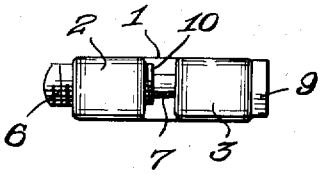
Figure 4 is a view looking at right angles to Figure 3.
Figure 5:
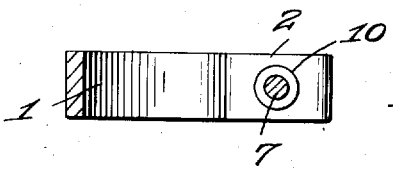
Figure 5 is a sectional view approximately on the line 5—5 of Figure 1.

In Figures 1 and 2 we have illustrated our improvement applied to the terminal post of a storage battery but obviously the device is not to be thus restricted in its useful application as the same may be successfully employed in any connection where a clamp is required.

The clamp in the showing of the drawing comprises a ring body 1 which is of metal that is yieldable under pressure. The body of the clamp may be formed of hingedly connected sections. The ends of the split clamp 1 are formed with enlarged extensions 2 and 3, respectively. These enlarged ends are provided with alining openings, the opening through the end 2 being threaded, as at 4. The opening through the end 3 is indicated by the numeral 5 and is not threaded. The diameter of the opening 5 is less than that of the opening 4.

The numeral 6 designates the threaded portion of a bolt. The bolt has a reduced non-threaded shank extension 7 whose outer end is squared, as at 8. The shank 7 is of a size to be freely received through the opening 8 without contacting with the wall thereof and after the shank is passed through the opening there is rigidly fixed on the squared end 8 thereof a head 9. The bolt proper, that is, the threaded portion 6 is screwed in the threaded bore 4, a wrench being applied to the head 9 for this operation. When the bolt is screwed partly home the head 9 will contact with the outer face of the clamp end 3, and during the screwing operation the ends 2 and 3 of the clamp will be forced toward each other, thus compressing the body of the clamp around the terminal post or other object engaged thereby. When the bolt is screwed in a direction reverse to that just described, the bolt will move out of the threaded bore 4 to bring the shoulder 10 between the shank and bolt proper into contact with the inner face of the end 3 of the clamp and the further turning of the bolt in this direction will cause the ends 2 and 3 to be forced away from each other and thereby expand the body of the clamp.

Thus it will be noted that regardless of the adhesion of the clamp to the article engaged thereby the same can be readily removed therefrom and likewise the clamp may be readily and freely moved to tight frictional engagement with the said object. When employed as a battery terminal clamp the brass or like metal terminal 11 for the insulated conductor is engaged between the head 9 of the bolt and the outer face of the end 3 of the clamp as disclosed by Figure 1 of the drawing.

It is believed that the foregoing description when read in connection with the accompanying drawing will fully and clearly set forth the construction and advantages of the improvement to those skilled in the art to which such invention relates so that further detailed description will not be required. Obviously we do not wish to be restricted to the precise details herein set forth and, therefore, hold ourselves entitled to make such changes therefrom as fairly fall within the scope of what we claim.

The invention having been described, what is claimed as new and useful is:

1. A circumferentially contractile clamp comprising a split body member, and a clamping screw bridging the ends of the body member and threadingly engaged with the one but having an angular or turning movement in the other and also a limited axial movement therein, so that on rotation of the screw in one direction the body member is circumferentially reduced whereas rotation in the other direction will effect spreading of the body member.

2. A circumferentially contractile clamp comprising a split body member, and a clamping screw bridging the body member at the split and threadingly engaged with one end of the body member but having free angular or turning movement in the other end thereof, the screw being provided with stops abutting on opposite sides of that end of the body member in which it freely turns.

3. A split ring metal clamp which is yieldable under pressure, and which has its ends widened and thickened, an adjustable shouldered member received through the said ends of the clamp and said member having a headed end designed to contact with one of the end members of the clamp when the said members are adjusted longitudinally for compressing the body of the clamp and which shoulder, when the member is adjusted in a second direction, is adapted to contact with the inner face of one end of the clamp for spreading the clamp ends away from each other and for expanding the body thereof.

LEON R. HAND.
LEWIS A. EYSTER.